Jan. 21, 1930.                I. S. KING                 1,744,554
                        CROSS CHAIN FASTENER
                        Filed March 28, 1928
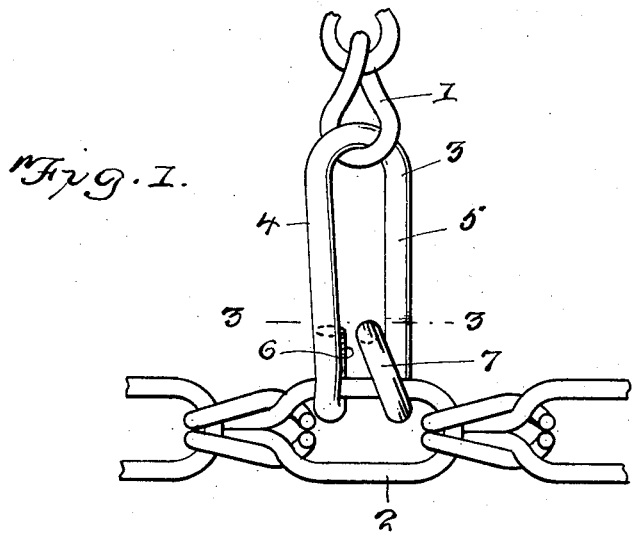
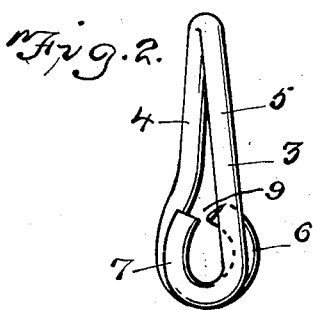
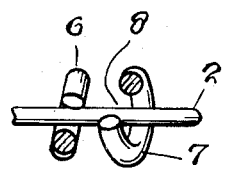
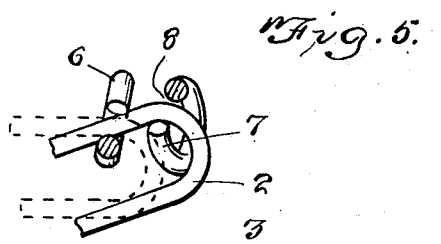
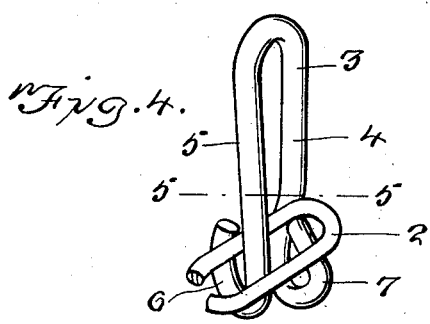
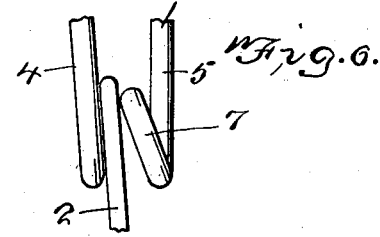
I. S. King
INVENTOR
BY Victor J. Evans
ATTORNEY Patented Jan. 21, 1930

1,744,554

UNITED STATES PATENT OFFICE

IRVING S. KING, OF NEW CANAAN, CONNECTICUT

CROSS-CHAIN FASTENER

Application filed March 28, 1928. Serial No. 265,458.

In anti-skid chains for automobiles or the like, the cross or traction chains being subjected to wear frequently become worn to an extent as to render the device deficient or useless. When this occurs it is necessary for the driver to take his anti-skid chain to a repairman to have new links applied. The cross chains of such chain may be readily purchased but an amount of time and labor is required for the application of said cross chains to the side chains. It is, therefore, the object of the present invention to provide a fastener in the nature of a link for attaching the cross chains to the links of the side chains in an easy, quick and expeditious manner and without the requirement of tools, and further wherein the cross links will be attached in an efficient manner which will not allow the accidental separation thereof from the side links of the chain.

To the attainment of the foregoing the invention resides in the improvement as hereinafter described and definitely claimed.

In the drawings:

Figure 1 is a fragmentary side elevation illustrating a cross chain attached to the link of a side chain of an anti-skid device in accordance with this invention.

Figure 2 is a side elevation of the improvement.

Figure 3 is a sectional view approximately on the line 3—3 of Figure 1, looking in the direction of the arrow.

Figure 4 is a perspective view illustrating a manner in which the improvement is attached to the link of a cross chain.

Figure 5 is a sectional view approximately on the line 5—5 of Figure 4, to better illustrate the manner in which the link is arranged between the hooks of the attaching link or member.

Figure 6 is a fragmentary view showing the manner in which the link of the cross chain is initially received between the hooks of the attaching chain as well as the manner in which such link is removed from the attaching link.

It will be noted as the description progresses that I have provided an extremely simple but thoroughly efficient device for its purpose.

Referring now to the drawings, the numeral 1 designates certain of the traction links of an anti-skid chain, 2 the links of a side chain and 3 my improved connecting link. The link 3 comprises a cross sectionally round strong metal member which is centrally rounded upon itself to provide the same with arms 4 and 5, respectively. The arms 4 and 5 from their connecting portion are arranged at opposite angles with respect to each other. The arm 4 has its end rounded to provide the same with a hook 6 which is arranged substantially in a plane with that of the said arm 4 and the end of the hook projects a slight distance inwardly with respect to the arm 5, leaving therebetween a space or passage 9 through which one of the arms or sides of a link of the chain 2 may pass. Preferably the end of the hook 6 is extended at a slight inward inclination with respect to the arm 4, as disclosed by Figure 1 of the drawings.

The second arm 5 of the link has its end also rounded to provide the same with a hook 7. This hook, as disclosed most clearly by Figures 1 and 6 of the drawings, has its end arranged at a determined inward angle with respect to the arm 5, the end of the said hook 7 being directed toward and terminating substantially in a plane with the end of the hook 6. Looking at the device as disclosed by Figure 2 of the drawings it will be seen that the passage between the confronting ends of the hooks 6 and 7 is of a width that will not permit of the passage of a link 2 therebetween, but the inwardly inclined hook 7 has its end sufficiently spaced away from the arm 4 as to permit the insertion of a link between these elements as disclosed by Figure 6 of the drawing. The link 2 is thus arranged vertically with respect to the position of the link 3 as disclosed by the drawings. The link 2 is now swung or canted so that the same may be received in the hook 6. The link is now given a turn so that the same assumes the angular position disclosed by Figure 4 of the drawings, which permits of the said link being brought through the passage between the hook 7 and the arm 4. When the link is in its straightened position as disclosed by Fgure 1 of the drawings, the end of the hook 7 will overlie the link and thereby prevent the free removal of the said link 2 from the connecting link 3, and the link can only be removed by reversing the operation required in arranging the said link 2 between the jaws of the connecting link 3.

Having described the invention, I claim:

A connecting link between the cross and side chains of an anti-skid device for wheels, comprising a member which is round in cross section and which is centrally rounded upon itself and designed to be attached to the end link of a cross chain, the arms of the connecting link from its said rounded portion being disposed at outward angles with respect to each other and the ends of the said arms being rounded upon themselves to provide hooks the hook formed on the end of one of the arms being arranged at a slight inclination thereto and the end of the said hook terminating slightly inwardly of the second arm of the link, the hook on the second arm of the link being arranged at a desired inward angle with respect to the said arm, and having its end directed toward the first mentioned arm and the said end being arranged substantially in a plane with the end of the first mentioned hook and spaced from the first mentioned arm a distance approximately equaling the thickness of one of the links of the cross chain and the space between the hooks and arms likewise permitting the insertion of the link of a side chain therebetween, and whereby the said side chain must be received initially into the first mentioned hook, canted or inclined before the same can pass into the second mentioned hook, and the said link when arranged in normal position having the end of the said second mentioned hook overlying the same and whereby the link of the side chain cannot be accidentally removed from the jaws of the connecting link.

In testimony whereof I affix my signature.

IRVING S. KING.